US009566512B2

(12) United States Patent
Schantz et al.

(10) Patent No.: US 9,566,512 B2
(45) Date of Patent: Feb. 14, 2017

(54) SELECTIVELY ARRANGEABLE, MULTI-MODE INPUT CONTROLLER

(71) Applicant: LENOVO (Singapore) PTE, LTD., New Tech Park (SG)

(72) Inventors: Daniel Jordan Schantz, Raleigh, NC (US); Michaela Rose Case, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 397 days.

(21) Appl. No.: 14/182,958

(22) Filed: Feb. 18, 2014

(65) Prior Publication Data

US 2015/0234479 A1     Aug. 20, 2015

(51) Int. Cl.
| | | |
|---|---|---|
| *G06F 3/041* | (2006.01) | |
| *A63F 13/24* | (2014.01) | |
| *A63F 13/26* | (2014.01) | |
| *A63F 13/21* | (2014.01) | |
| *A63F 13/2145* | (2014.01) | |
| *A63F 13/22* | (2014.01) | |
| *G06F 1/16* | (2006.01) | |

(52) U.S. Cl.
CPC .............. *A63F 13/24* (2014.09); *A63F 13/21* (2014.09); *A63F 13/2145* (2014.09); *A63F 13/22* (2014.09); *A63F 13/26* (2014.09); *G06F 1/1615* (2013.01)

(58) Field of Classification Search
CPC .......... G06F 3/017; G06F 3/013; G06F 3/011; G06F 3/005; G06F 3/0482; G06F 3/167; G06F 3/012; G06F 3/016
See application file for complete search history.

(56) References Cited

U.S. PATENT DOCUMENTS

| | | | | |
|---|---|---|---|---|
| 7,933,638 B2* | 4/2011 | Hakamata | ............. | G06F 1/1622 |
| | | | | 455/550.1 |
| 8,914,064 B2* | 12/2014 | Tahk | ................... | G06F 3/04845 |
| | | | | 455/556.1 |
| 2003/0203747 A1* | 10/2003 | Nagamine | ........... | H04M 1/0243 |
| | | | | 455/575.3 |
| 2007/0085759 A1* | 4/2007 | Lee | ....................... | G06F 1/1616 |
| | | | | 345/1.1 |
| 2008/0084659 A1* | 4/2008 | Misawa | ................ | G06F 1/1622 |
| | | | | 361/679.01 |
| 2011/0083598 A1* | 4/2011 | Tashiro | .................. | D05B 19/10 |
| | | | | 112/470.03 |

* cited by examiner

*Primary Examiner* — Olga Merkoulova
(74) *Attorney, Agent, or Firm* — Kunzler Law Group

(57) ABSTRACT

An apparatus for providing input via a selectively arrangeable, multi-mode input controller is disclosed. A method and computer program product also perform the functions of the apparatus. The apparatus includes a processor, a first body having a first input device, a second body pivotably connected to the first body and having a second input device, and a memory that stores code executable by the processor, the code comprising code that receives indication of an orientation of the first body with respect to the second body and code that alters operation of the first input device based on the orientation of the first body with respect to the second body.

20 Claims, 9 Drawing Sheets

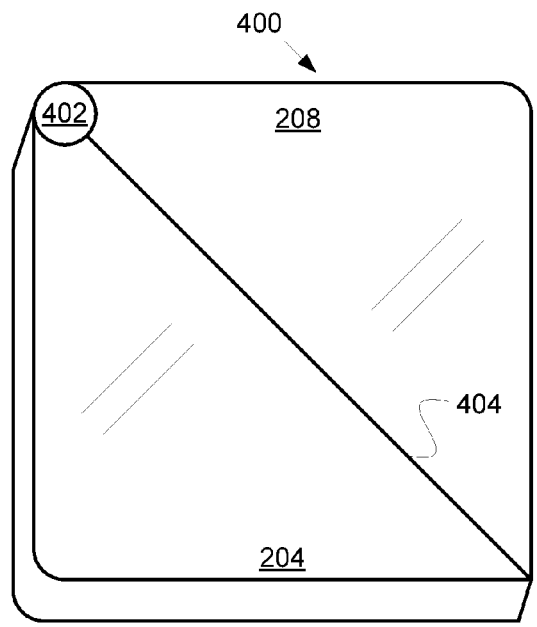
FIG. 4A1
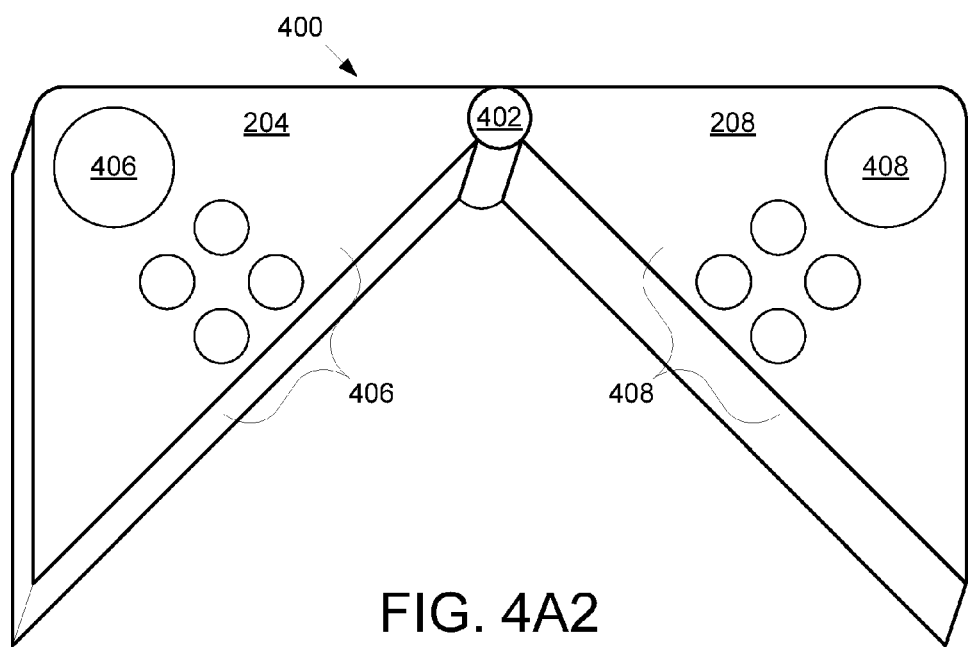
FIG. 4A2

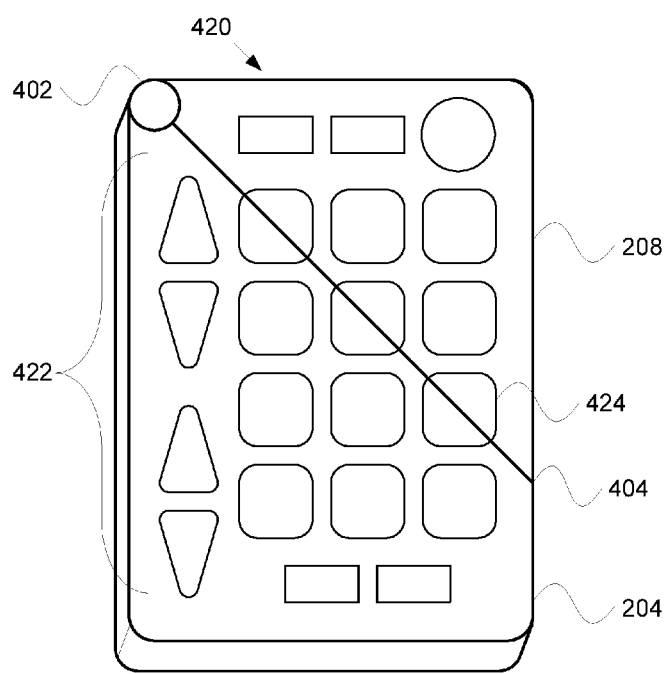
FIG. 4B1
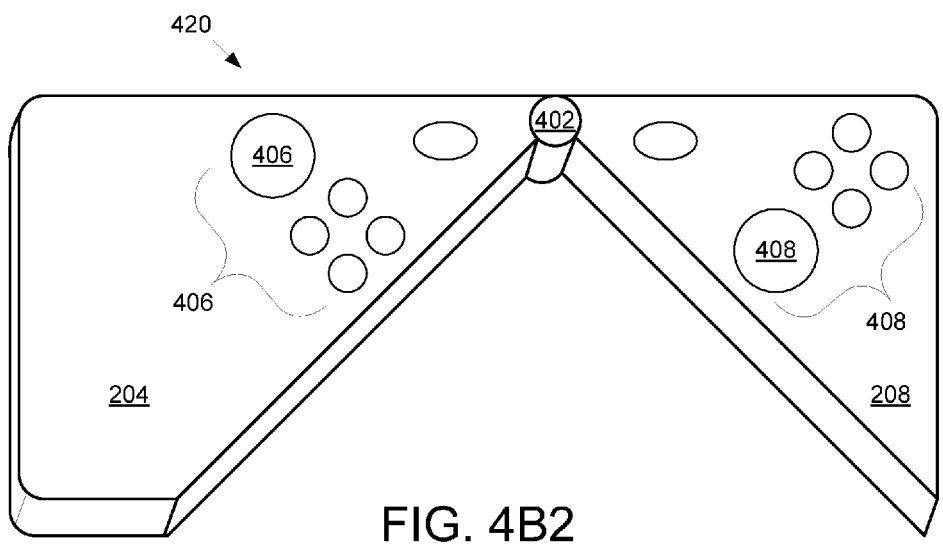
FIG. 4B2

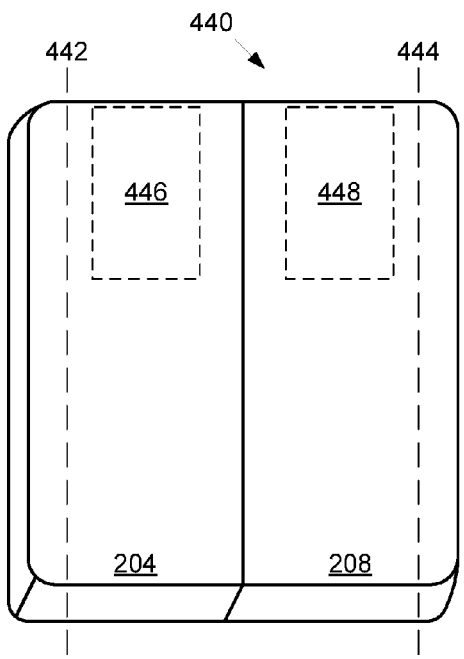
FIG. 4C1
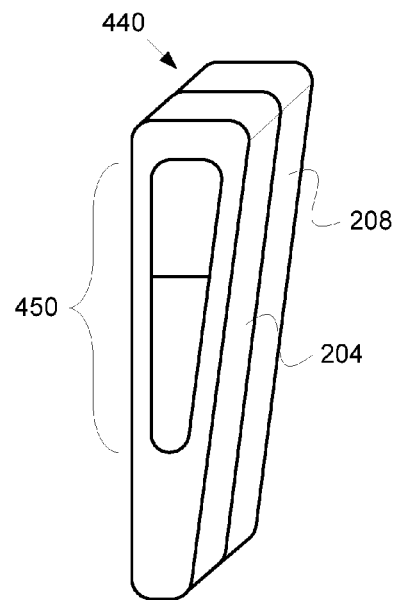
FIG. 4C3
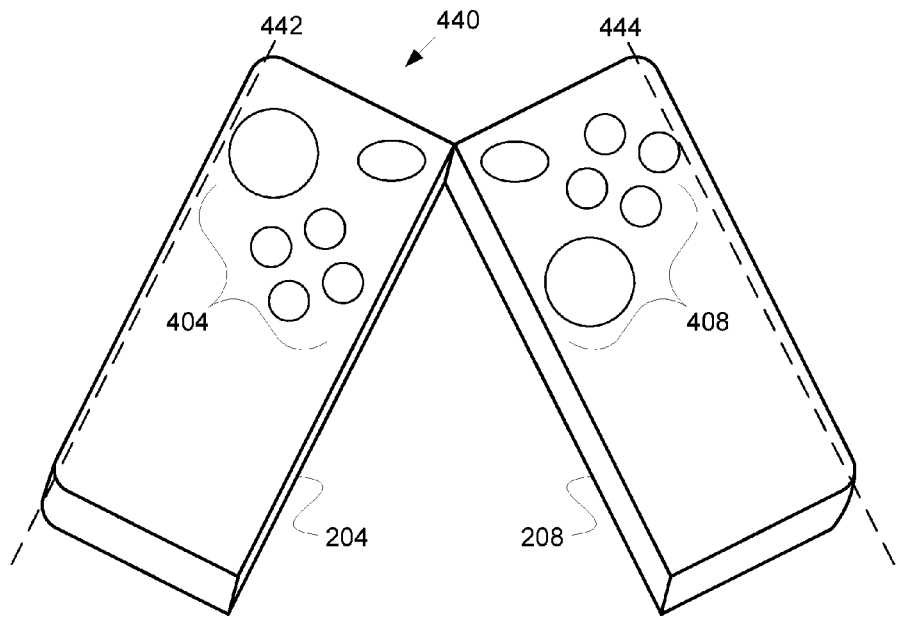
FIG. 4C2

SELECTIVELY ARRANGEABLE, MULTI-MODE INPUT CONTROLLER

BACKGROUND

Field

The subject matter disclosed herein providing input to an electronic device and more particularly relates to providing input via a selectively arrangeable, multi-mode input controller.

Description of the Related Art

Current computers (including desktop, all-in-one, laptop, and tablet computers) are being utilized and promoted for gaming. Accessory products are being built to accommodate computer based gaming. Touch sensitive input devices, such as gesture pads, may be used to provide input. However, existing gesture pads are not comfortable for long term gaming use and do not feel like a gaming controller. Additionally, the functionality of existing gesture pads is limited to that of a stationary mouse or common pointing device. Further, existing gaming controllers are not easily paired with tablet systems and do not perform the same functions as a gesture pad.

Additionally, video game consoles are often paired with a home entertainment system including one or more of a television, an optical disc player (e.g., a CD, DVD, or Blu-Ray player), a set-top box, an audio system, and the like. In many cases one or more devices in the home entertainment system include a computer-like graphical user interface for web and/or file browsing. Conventionally, each device has its own controller, but existing controllers are not capable of controlling every device as well as providing easy input for the computer-like graphical user interfaces.

BRIEF SUMMARY

An apparatus for providing input via a selectively arrangeable, multi-mode input controller is disclosed. A method and computer program product also perform the functions of the apparatus. The apparatus includes a processor, a first body having a first input device, a second body pivotably connected to the first body and having a second input device, and a memory that stores code executable by the processor, the code comprising code that receives indication of an orientation of the first body with respect to the second body and code that alters operation of the first input device based on the orientation of the first body with respect to the second body.

A method for providing input via a selectively arrangeable, multi-mode input controller is disclosed. The method includes determining an arrangement of a first body with respect to a second body, the first body pivotably connected to the second body, receiving an input, interpreting the input based on the arrangement of the first and second bodies, and sending control signals to an external device responsive to interpreting the input.

A program product for providing input via a selectively arrangeable, multi-mode input controller is disclosed. The program product includes a computer readable storage medium that stores code executable by a processor to perform determining an arrangement of an input device, mapping the determined arrangement to an input profile, and interpreting received input according to the input profile.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4A1 is a diagram illustrating a top view of an apparatus for providing input via a selectively arrangeable, multi-mode input controller arranged in a first arrangement;

FIG. 4A2 is a diagram illustrating a top view of the apparatus of FIG. 4A1 arranged in a second arrangement;

FIG. 4B1 is a diagram illustrating a top view of an apparatus for providing input via a selectively arrangeable, multi-mode input controller arranged in a first arrangement;

FIG. 4B2 is a diagram illustrating a top view of an apparatus of FIG. 4B1 arranged in a second arrangement;

FIG. 4C1 is a diagram illustrating a top view of an apparatus for providing input via a selectively arrangeable, multi-mode input controller arranged in a first arrangement;

FIG. 4C2 is a diagram illustrating a top view of an apparatus of FIG. 4C1 arranged in a second arrangement;

FIG. 4C3 is a diagram illustrating a side view of an apparatus of FIG. 4C1;

DETAILED DESCRIPTION

Figure 1:
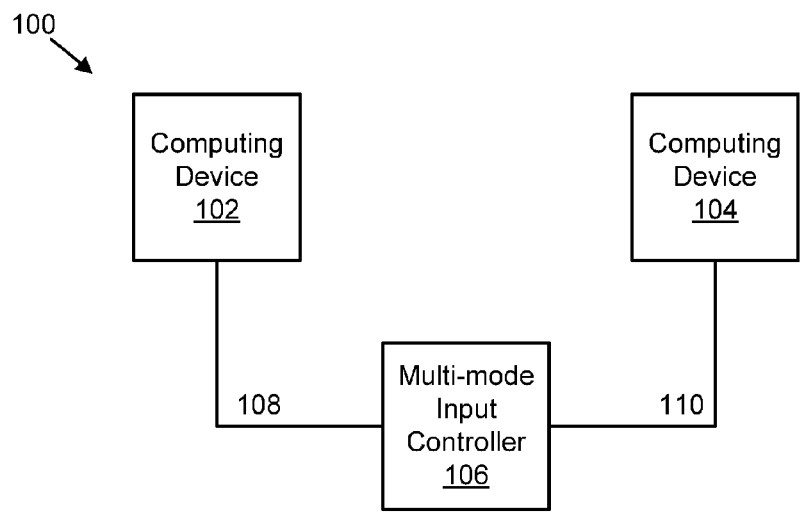
FIG. 1 is a schematic block diagram illustrating one embodiment of a system for providing input via a selectively arrangeable, multi-mode input controller.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the systems, apparatuses, methods, and computer program products described herein distinguish between an electronic device arranged in a first state and in a second state. While in the first state, the electronic device interprets input according to a first set of parameters and outputs control signals using a first protocol. While in the second state, the electronic device interprets input according to a second set of parameters and outputs control signals using a second protocol. The state of the electronic device is dynamically determined and the input is interpreted according to a current arrangement.

For example, the electronic device may include a pointing device mode where it acts as a gesture pad and a game controller mode where it acts as a gaming controller. The electronic device can be pulled apart at one corner to form a similar design to a standard video game controller. The electronic device can detect when it is in the game controller mode and provide dynamic buttons to the user via touchscreen or backlit capacitive buttons. In some embodiments, the electronic device includes a manual toggle or even allow access to these controls when in the gesture pad mode. Like other gaming controllers, the electronic device can utilize technologies such as haptic actuators to accommodate a good gaming experience.

The apparatuses may include a processor, a first body having a first input device, a second body pivotably connected to the first body and having a second input device, and a memory that stores code executable by the processor, the code comprising code that receives indication of an orientation of the first body with respect to the second body and code that alters operation of the first input device based on the orientation of the first body with respect to the second body.

In some embodiments, the apparatuses include an angle sensor operatively coupled to the first body and the second body that determines an angle between the first body and the second body, wherein the code that receives indication of an orientation comprises code that determines the arrangement based on the determined angle.

In some embodiments, the first body includes a first display and the second body comprises a second display. In further embodiments, the first input device comprises includes a first touch panel and the second input device includes a second panel, wherein the second touch panel acts as a continuation of the first touch panel in response to the apparatuses being arranged in a first configuration.

In some embodiments, the apparatuses include a transmitter that sends input commands to an external device and a protocol module that selects a signaling protocol based on the arrangement of the first body and the second body.

In some embodiments, the apparatuses include a bias member that maintains the first body and the second body in a first configuration, wherein the first input device and the second input device process input in a first manner in response to the apparatuses being in the first configuration. In further embodiments, the bias member may include a magnet that maintains the first body adjacent to the second body. In some embodiments, the apparatuses include a bias member that urges the first body and the second body into a predetermined arrangement.

In some embodiments, the apparatuses are configured as a touch panel mouse device in response to the first body and the second body being arranged in the first configuration. In some embodiments, the apparatuses is configured as a gaming controller in response to the first body and the second body being arranged in an extended configuration. In some embodiments, the apparatuses is configured as a remote control in response to the first body and the second body being arranged in a closed configuration.

The methods may include determining an arrangement of a first body with respect to a second body, the first body pivotably connected to the second body, receiving an input, interpreting the input based on the arrangement of the first and second bodies, and sending control signals to an external device responsive to interpreting the input.

In some embodiments, the methods may also include displaying a virtual control based on the arrangement of the first and second bodies and reconfiguring the virtual control in response to a change in the arrangement of the first and second bodies. In some embodiments, the methods may also include selecting a signaling protocol based on the arrangement of the first and second bodies. A different signaling protocol may be selected in response to a change in the arrangement of the first and second bodies. The methods may also include sending first control signals suitable for controlling a first device in response to the first and second bodies being arranged in a first configuration, and sending second control signals suitable for controlling a second device, different than the first device, in response to the first and second bodies being arranged in a second configuration.

In some embodiments, the methods further comprising configuring a touch panel on the second body to act as a continuation of touch panel on the first body in response to the first and second bodies being arranged in a first configuration.

The program products may include a computer readable storage medium that stores code executable by a processor to perform determining an arrangement of an input device, mapping the determined arrangement to an input profile, and interpreting received input according to the input profile.

In some embodiments, the program products includes code to perform displaying a control based on the arrangement of the input device and reconfiguring the control in response to a change in the arrangement of the input device. In some embodiments, the program products includes code to perform selecting a signaling protocol based on the arrangement of the input device and sending control signals to an external device responsive to interpreting the received input, the control signals conforming to the selected protocol.

The disclosed systems, apparatuses, methods, and computer program products attempt to further the accessory list for engaging classic videogame users in modern app based games, as well as, provide a more comfortable experience for long term application-based game play. The underside of the electronic device can be anything from flat to including various contours to improve the ergonomics. Any such contours can be permanent or detachable and can be made of hard and/or soft materials.

FIG. 1 depicts a system 100 for providing input via a selectively arrangeable, multi-mode input controller, according to embodiments of the disclosure. The system 100 includes a first electronic device 102, a second computing electronic device 104, and a multi-mode input controller 106. The first electronic device 102 and the multi-mode input controller 106 are communicably connected via a first communication link 108. The second electronic device 104 and the multi-mode input controller 106 are communicably connected via a second communication link 110.

The first electronic device 102 receives input commands from the multi-mode input controller 106 via the first communication link 108 and performs functions and/or routines responsive to the input commands. In some embodiments, the input commands are pointer commands for controlling a cursor or pointer in a graphical user interface (GUI) on the first electronic device 102. In some embodiments, the input commands are remote control commands for adjusting volume, channel, and other settings of the first electronic device 102.

The first electronic device 102 may include a processor, a computer memory, a network interface device, a wireless transceiver, a display, a data storage device, and the like. Examples of the first electronic device 102 include, but are not limited to, a desktop computer, a laptop computer, a tablet computer, a smartphone, a television, an optical disc player (e.g., a CD, DVD, or Blu-Ray player), a set-top box, an audio or video system, a home theatre, and the like.

The second electronic device 104 receives input commands from the multi-mode input controller 106 via the first communication link 108 and performs functions and/or routines responsive to the input commands. In some embodiments, the input commands are gaming controller commands for controlling and object or character in a game run on the second electronic device 104. For example, the gaming controller commands may include movement commands and/or action commands. In further embodiments, the gaming controller commands adjust settings of the game or of the second electronic device 104. In some embodiments, the input commands are pointer commands for controlling a cursor or pointer in a GUI on the second electronic device 104.

The second electronic device 104 may include a processor, a computer memory, a network interface device, a wireless transceiver, a display, a data storage device, and the like. Examples of the first electronic device 102 include, but are not limited to, a video game console, a handheld game console, a personal computer (e.g., a desktop, a laptop, a tablet, or a handheld computer), a smartphone, and the like. In some embodiments, the second electronic device 104 may be co-located with the first electronic device 102. For example, the first electronic device 102 may be a television and the second electronic device 104 may be a gaming console (i.e., a video game console) integrated with the television, where the first electronic device 102 and the second electronic device 104 are logical divisions of the same electronic device.

The multi-mode input controller 106 receives user input and sends input commands to the first electronic device 102 and/or the second electronic device 104. The input commands are communicated via one or more control signals on the first communication link 108 and/or the second communication link 110. The multi-mode input controller 106 sends control signals (e.g., input commands) to the first electronic device 102 when in a first mode, but sends control signals to the second electronic device 104 when in a second mode. The control signals sent to the first electronic device 102 differ from the control signals sent to the second electronic device 104. For example, the control signals may differ in protocol, waveform, signal medium, and the like.

In some embodiments, the multi-mode input controller 106 communicates with the first electronic device 102 and the second electronic device 104 using different frequencies. In some embodiments, the multi-mode input controller 106 may communicate with the first electronic device 102 and the second electronic device 104 using different communication standards or communication protocols. For example, the first electronic device 102 may communicate with the multi-mode input controller 106 using infrared (IR) signals, while the second electronic device 104 may communicate with the multi-mode input controller 106 using radio frequency (RF) signals. In some embodiments, the multi-mode input controller 106 may communicate with the first electronic device 102 and/or the second electronic device 104 using a proprietary communication protocol.

In some embodiments, the multi-mode input controller 106 functions as a pointing device that allows a user to control a graphical cursor or pointer. The multi-mode input controller 106 may send input commands for pointer movement, for mouse button (e.g., left-button, right-button, and the like) presses, for scroll indications, and the like. In some embodiments, the multi-mode input controller 106 functions as a computer mouse. For example, the multi-mode input controller 106 may be grasped and movement of the multi-mode input controller 106 translated. In some embodiments, the multi-mode input controller 106 functions as a trackpad. For example, the multi-mode input controller 106 may be a touch panel or touchscreen device that translates finger movements into on-screen cursor movements, button presses, and/or scroll indications. In further embodiments, the multi-mode input controller 106 can determine multiple, simultaneous touches and functions as a multi-touch touchpad that interprets finger gestures to implement advanced commands.

In some embodiments, the multi-mode input controller 106 functions as a gaming controller for a gaming console or for a personal computer running, for example, a video game. In some embodiments, the multi-mode input controller 106 may mimic the shape of conventional gaming controllers, such as game pads and the like. The multi-mode input controller 106 may send input commands for in-game movements or actions such as commands to control an in-game character or object. In some embodiments, the multi-mode input controller 106 controls of the gaming controller are virtual controls and the multi-mode input controller 106 displays images of buttons, directional controls, and the like informing the user where to place fingers to input commands. In some embodiments, the locations of the virtual controls may be user-configurable and/or game specific. For example, the location of the virtual controls may vary from game to game or from user to user.

In some embodiments, the multi-mode input controller 106 functions as a remote control for an electronic device. For example, the first electronic device 102 may be a television, an optical disc player (e.g., a CD, DVD, or Blu-Ray player), a set-top box, an audio or video system, or the like and the multi-mode input controller 106 may be used to control functions of the first electronic device 102, such as playing or searching media, adjusting channels or volume, and the like. The multi-mode input controller 106 may send input commands for adjusting settings of the first electronic device 102 and/or the second electronic device 104.

In some embodiments, the multi-mode input controller 106 functions as a keyboard or text input device for an electronic device. For example, the multi-mode input controller 106 may be used to input characters to a personal computer, or the like. The multi-mode input controller 106 may be a virtual keyboard, e.g., having an image of a keyboard displayed on a touch sensitive surface.

In some embodiments, the multi-mode input controller 106 includes a transceiver for communicating directly with the first electronic device 102 and/or the second electronic device 104. In some embodiments, the multi-mode input controller 106 may not be capable of communicating with one of the first electronic device 102 and the second electronic device 104 and thus may employ an external repeater or adapter to bridge the communication gap. For example, the first electronic device 102 may be a television capable of receiving input commands via an infrared (IR) signal interface. If the multi-mode input controller 106 only includes a radio frequency (RF) transmitter, an adapter may be used to adapt the RF signals into IR signals. Control signals from the multi-mode input controller 106 may be adapted to IR signals, RF signals, ultrasonic signals, and/or the like.

The first communication link 108 communicatively couples the first electronic device 102 to the multi-mode input controller 106. The second communication link 110 communicatively couples the second electronic device 104 to the multi-mode input controller 106. In some embodiments, the first communication link 108 and/or the second communication link 110 may comprise physical wires or cables that connect the first electronic device 102 and/or the second electronic device 104 to the multi-mode input controller 106.

In some embodiments, the first communication link 108 and/or the second communication link 110 are wireless connections implemented using radio, infrared, ultrasonic, or the like. In further embodiments, the wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The communication links 108, 110 may be infrared connections including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

In some embodiments, the communication links 108 and 110 are a part of a network connecting the first electronic device 102, the second electronic device 104, and the multi-mode input controller 106. In further embodiments, the communication links 108 and 110 may be logical communication links on a network, such as the Internet.

Figure 2:
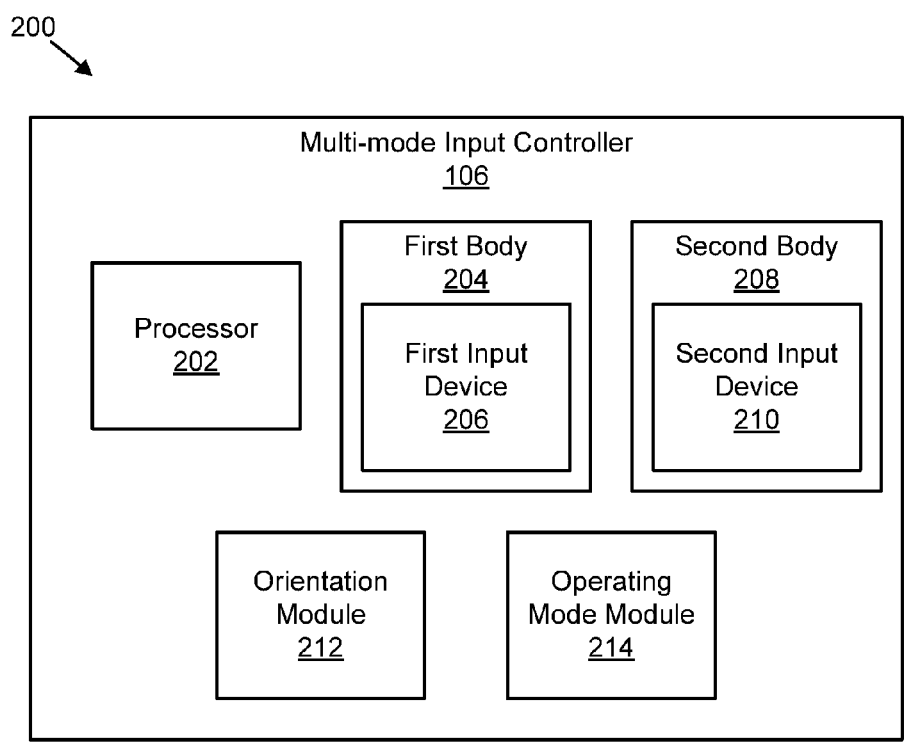
FIG. 2 is a schematic block diagram illustrating one embodiment of an apparatus for providing input via a selectively arrangeable, multi-mode input controller.

FIG. 2 is a schematic block diagram illustrating one embodiment of an apparatus 200 for text recognition using a tone indicator, according to embodiments of the disclosure. Apparatus 200 comprises a multi-mode input controller 106, such as the multi-mode input controller 106 described above with reference to FIG. 1. In general, as described above, the multi-mode input controller 106 may determine an arrangement of a first body and a second body, receive input, and alter operation of the multi-mode input controller 106 based on the determined arrangement. In the embodiments of FIG. 2, the multi-mode input controller 106 includes a processor 202, a first body 204, a second body 208, an orientation module 212, and an operating mode module 214. Components of the multi-mode input controller 106 may be interconnected by a communication medium, such as a computer bus.

The processor 202 may comprise any known controller capable of executing computer-readable instructions and/or capable of performing logical operations on the input text. For example, the processor 102 may be a microcontroller, a microprocessor, a central processing unit (CPU), a graphics processing unit (GPU), an auxiliary processing unit, a FPGA, or similar programmable controller. In some embodiments, the processor 202 executes instructions stored in memory to perform the methods and routines described herein.

The first body 204 includes a first input device 206 configured to receive input from a user. The first body 204 is connected to the second body 208 and is selectively arrangeable with respect to the second body 208. In some embodiments, the first body 204 rotates with respect to the second body 208 about a hinge, the hinge connecting the first body 204 to the second body 208. In some embodiments, the hinge is permanently attached to the first body 204 and the second body 208. In other embodiments, the hinge is detachably coupled to the first body 204 and the second body 208. In further embodiments, the first body 204 and the second body 208 are independently operable input devices coupled via the hinge 402 to operate as a single input device. In some embodiments, the hinge also communicatively couples the first body 204 to the second body 208 using wired and/or wireless connections.

In some embodiments, the first body 204 may include one or more sensor used by the orientation module 212 to determine the arrangement of the first and second bodies. In further embodiments, the one or more sensors may determine between two or more discrete arrangements. The one or more sensors may include a magnetic sensor, an optical or infrared sensor, an electronic switch, and the like. In some embodiments, the first body 204 includes one or more haptic actuators to provide haptic feedback device for good gaming experience and/or for tactile input feedback.

The first input device 206, in one embodiment, is configured to receive input from a user holding the multi-mode input controller 106. The first input device 206 may comprise any known human-to-machine interface. For example, the first input device 206 may be a touch panel, a button, a key, or the like. In some embodiments, the first input device 206 includes backlit capacitive buttons. In some embodiments, the first input device 206 may be integrated with a display, for example, as a touchscreen or similar touch-sensitive display. In further embodiments, the first input device 206 comprises a touchscreen that displays a virtual control, such as an image of a keyboard, keypad or button. A user may press the virtual control to provide input. In some embodiments, the first input device 206 comprises two or more different devices, such as a physical button and a touch panel.

In some embodiments, the hinge is permanently attached to the first body 204 and the second body 208. In other embodiments, the hinge is detachably coupled to the first body 204 and the second body 208. In further embodiments, the first body 204 and the second body 208 are independently operable input devices coupled via the hinge 402 to operate as a single input device. In some embodiments, the hinge also communicatively couples the first body 204 to the second body 208 using wired and/or wireless connections.

The second body 208 includes a second input device 210 configured to receive user input. The second body 208 is connected to the first body 204 and is selectively arrangeable with respect to the first body 204. In some embodiments, the second body 208 rotates with respect to the first body 204 about a hinge, the hinge connecting the first body 204 to the second body 208. In some embodiments, the hinge is permanently attached to the first body 204 and the second body 208. In other embodiments, the hinge is detachably coupled to the first body 204 and the second body 208. In further embodiments, the first body 204 and the second body 208 are independently operable input devices coupled via the hinge 402 to operate as a single input device. In some embodiments, the hinge also communicatively couples the first body 204 to the second body 208 using wired and/or wireless connections.

In some embodiments, the second body 208 may include one or more sensor used by the orientation module 212 to determine the arrangement of the first and second bodies. The one or more sensors may include a magnetic sensor, an optical or infrared sensor, an electronic switch, and the like. In some embodiments, the second body 208 includes one or more haptic actuators to provide haptic feedback device for good gaming experience and/or for tactile input feedback.

The second input device 210, in one embodiment, is configured to receive input from a user holding the multi-mode input controller 106. The second input device 210 may comprise any known human-to-machine interface. For example, the second input device 210 may be a touch panel, a button, a key, or the like. In some embodiments, the second input device 210 may be integrated with a display, for example, as a touchscreen or similar touch-sensitive display. In further embodiments, the second input device 210 comprises a touchscreen that displays a virtual control, such as an image of a keyboard, keypad, or button. A user may press the virtual control to provide input. In some embodiments, the second input device 210 comprises two or more different devices, such as a physical button and a touch panel.

The orientation module 212, in one embodiment, is configured to determine an arrangement of the first body 204 and the second body 208. In some embodiments, the orientation module 212 receives in indication of an orientation of the first body 204 with respect to the second body 208. The indication may be received from one or more sensors operatively coupled to the first body 204 and/or the second body 208. The one or more sensors may measure an angle between the first and second bodies, a distance between the first and second bodies, and the like. For example, an angle sensor may be operatively coupled to the first body 204 and the second body 208 that determines an angle between the first body 204 and the second body 208. The orientation module 212 may determine the arrangement of the first body 204 and the second body 208 based on the angle determined by the angle sensor.

In some embodiments, the orientation module 212 may determine between two or more discrete arrangements. For example, the orientation module 212 may determine whether the first body 204 and the second body 208 are in a closed arrangement or an extended arrangement. In the closed arrangement, a first edge of the first body 204 may be adjacent to a corresponding second edge of the second body 208. In the extended arrangement, the first edge may be positioned away from the second edge.

In some embodiments, the orientation module 212 is operatively coupled to a bias member that maintains the first body 204 and the second body 208 into a predetermined arrangement. For example, the bias member may include a magnet that maintains the first body 204 adjacent to the second body 208 and the orientation module 212 may include a magnetic sensor used to detect the proximity of the magnet. As another example, the bias member may be a spring that urges the first body 204 away from the second body 208 and the orientation module 212 may include a switch operatively connected to the spring such that the switch closes a circuit when the first body 204 and the second body 208 are in an extended arrangement.

The operating mode module 214, in one embodiment, is configured to alter the operation of at least the first input device based on the arrangement, or orientation, of the first body 204 with respect to the second body 208. In some embodiments, the operating mode module 214 alters the way input is processed by the first input device 206 and/or the second input device 210. For example, the first input device 206 may ignore touches in a particular area when the multi-mode input controller 106 is arranged in a first arrangement and may recognize touches in the particular are when the multi-mode input controller 106 is arranged in a second arrangement. As another example, the second input device 210 may interpret inputs as pointer commands when the multi-mode input controller 106 is arranged in a first arrangement and may interpret inputs as game control commands when the multi-mode input controller 106 is arranged in a second arrangement. In some embodiments, the operating mode module 214 causes particular virtual controls to be displayed on the first body 204 and/or the second body 208 based on the arrangement, or orientation, of the first and second bodies.

In some embodiments, the operating mode module 214 causes the multi-mode input controller 106 to operate in a first operating mode when the multi-mode input controller 106 is arranged in a first arrangement. When in the first operating mode, the first input device 206 and second input device 210 may interpret inputs using a first input profile and the multi-mode input controller 106 may send control commands to a first external device. The operating mode module 214 may further cause the multi-mode input controller 106 to operate in a second operating mode when the multi-mode input controller 106 is arranged in a second arrangement. When in the second operating mode, the first input device 206 and second input device 210 may interpret inputs using a second input profile and the multi-mode input controller 106 may send control commands to a second external device. In some embodiments, each operating mode may correspond to a function of the multi-mode input controller 106. For example, an operating mode may cause the multi-mode input controller 106 to function as a remote control, as a pointing input device, as a keyboard (i.e., a character input device), and/or as a gaming controller.

The operating mode module 214 may be configured to determine a change in orientation or arrangement of the multi-mode input controller 106 and to change from one operating mode to another operating mode based on the new orientation or arrangement. In some embodiments, the operating mode module 214 receives an indication from the orientation module 212 in response to a change in orientation or arrangement of the multi-mode input controller 106. In some embodiments, the operating mode module 214 may change the way input is interpreted by the first input device 206 and/or second input device 210. In some embodiments, the operating mode module 214 may change the virtual controls that are displayed on the first body 204 and/or second body 208. In some embodiments, the operating mode module 214 may change a signaling protocol (e.g., a data format, a packet structure, a modulation, or the like), a waveform (e.g., an amplitude, a carrier frequency, or the like), and/or a communication link associated with the control signals sent to the external device. In further embodiments, the operating mode module 214 may change the external device with which the multi-mode input controller 106 sends the control signals.

Figure 3:
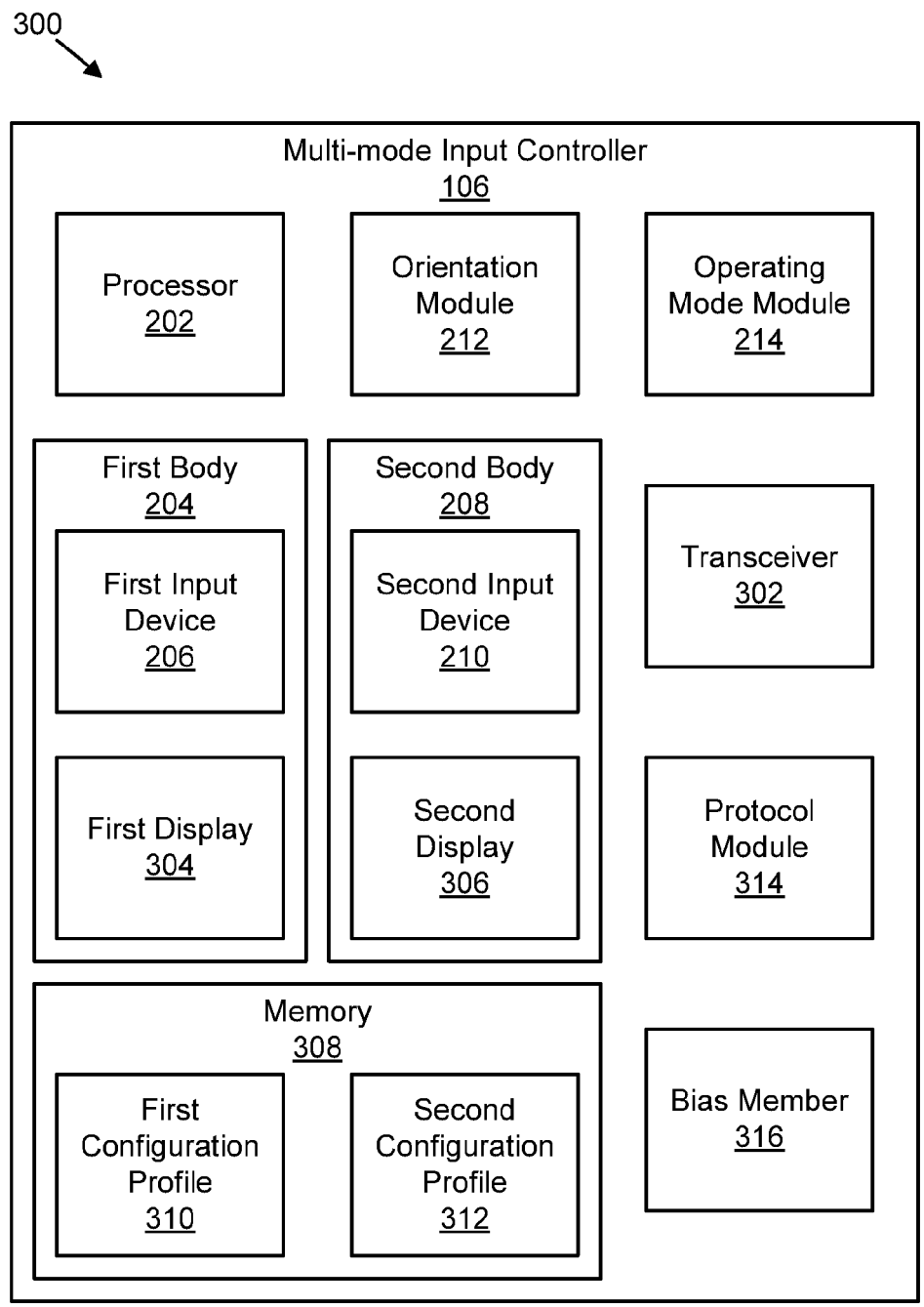
FIG. 3 is a schematic block diagram illustrating another embodiment of an apparatus for providing input via a selectively arrangeable, multi-mode input controller.

FIG. 3 is a schematic block diagram illustrating one embodiment of an apparatus 300 for text recognition using a tone indicator, according to embodiments of the disclosure. Apparatus 300 comprises a multi-mode input controller 106, such as the multi-mode input controller 106 described above with reference to FIGS. 1 and 2. In general, as described above, the multi-mode input controller 106 may determine an arrangement of a first body and a second body, receive input, and alter operation of the multi-mode input controller 106 based on the determined arrangement. The multi-mode input controller 106 may include a processor 202, a first body 204, a second body 208, an orientation module 212, and an operating mode module 214, as described above with reference to FIG. 2. Additionally, in the embodiments of FIG. 3, the multi-mode input controller 106 includes a transceiver 302, a first display 304, a second display 306, a memory 308, a protocol module 314, and a bias member 316. Components of the multi-mode input controller 106 may be interconnected by a communication medium, such as a computer bus.

The transceiver 302, in one embodiment, is configured to transmit control signals to an external device, such as the first electronic device 102 and/or the second electronic device 104. The transceiver 302 may transmit control signals using a wired or wireless communication medium. In some embodiments, the transceiver 302 includes a RF transmitter for sending input commands via RF signals. In further embodiments, the transceiver 302 is capable of transmitting on multiple radio frequency bands. In some embodiments, the transceiver 302 includes an IR transmitter for sending input commands via IR signals. In some embodiments, the transceiver 302 includes an ultrasonic transmitter for sending input commands via ultrasonic signals. In some embodiments, the transceiver 302 includes a receiver for receiving signals from the first electronic device 102 and/or the second electronic device 104. For example, the transceiver 302 may receive signals when coupling to the first electronic device 102 and/or the second electronic device 104.

The first display 304, in one embodiment, is located in a fixed arrangement with the first body 204. In some embodiments, the first display 304 is integrated with the first body 204. For example, the first display 304 may be located on an upper surface of the first body 204. In further embodiments, the first display 304 may be integrated with the first input device 206, for example, as a touchscreen or similar touch-sensitive display. The first display 304 may comprise any known electronic display capable of outputting visual data to a user. For example, the first display 304 may be an LCD display, an LED display, an OLED display, a projector, or similar display device capable of outputting images, text, or the like to a user. The first display 304 may receive image data for display from the processor 202, the transceiver 302 and/or the memory 308.

In some embodiments, the first display 304 displays one or more virtual controls. The virtual controls may be images of keys, buttons, and/or other controls that a user presses to provide input. The images are displayed at locations on the first input device 206 configured to detect input associated with the virtual controls. In some embodiments, the location of the virtual controls may be user defined. In some embodiments, the location of the virtual controls is operating mode specific or application specific.

The second display 306, in one embodiment, is located in a fixed arrangement with the second body 208. In some embodiments, the second display 306 is integrated with the second body 208. For example, the second display 306 may be located on an upper surface of the second body 208. In further embodiments, the second display 306 may be integrated with the second input device 210, for example, as a touchscreen or similar touch-sensitive display. The second display 306 may comprise any known electronic display capable of outputting visual data to a user. For example, the second display 306 may be an LCD display, an LED display, an OLED display, a projector, or similar display device capable of outputting images, text, or the like to a user. The first display 304 may receive image data for display from the processor 202, the transceiver 302 and/or the memory 308.

In some embodiments, the second display 306 displays one or more virtual controls. The virtual controls may be images of keys, buttons, and/or other controls that a user presses to provide input. The images are displayed at locations on the second input device 210 configured to detect input associated with the virtual controls. In some embodiments, the location of the virtual controls may be user defined. In some embodiments, the location of the virtual controls is operating mode specific or application specific.

The memory 308, in one embodiment, may be implemented as a computer readable storage medium. In some embodiments, the memory 308 contains a plurality of configuration profiles, such as a first configuration profile 310 and a second configuration profile 312. The first configuration profile 310 is a collection of settings, parameters, and/or other configurations. In some embodiments, the first configuration profile 310 is associated with a first arrangement of the multi-mode input controller 106. In some embodiments, the first configuration profile 310 is associated with a first operating mode of the multi-mode input controller 106. In certain embodiments, first configuration profile 310 defines a first set of virtual controls (and their locations), a first input profile for interpreting input, a first set of communication protocols for sending control signals, and/or a first external device to which the control signals are sent. The first input profile may map user input (e.g., finger motion, gestures, and/or button presses) to a first set of functions, commands, actions, and/or routines. In further embodiments, the input profile may provide a library of available input commands.

Similarly, the second configuration profile 312 is a collection of settings, parameters, and/or other configurations different from the first configuration profile 310. In some embodiments, the second configuration profile 312 is associated with a second arrangement of the multi-mode input controller 106. In some embodiments, the second configuration profile 312 is associated with a second operating mode of the multi-mode input controller 106. In certain embodiments, second configuration profile 312 defines a second set of virtual controls (and their locations), a second input profile for interpreting input, a second set of communication protocols for sending control signals, and/or a second external device to which the control signals are sent. The second input profile may map user input (e.g., finger motion, gestures, and/or button presses) to a second set of functions, commands, actions, and/or routines. In further embodiments, the second input profile may provide a library of available input commands. Additionally, while two configuration profiles are shown in FIG. 3, the memory 308 may include additional configuration profiles.

In some embodiments, the memory 308 includes one or more user profiles that define deviations from the default configuration profiles. Each user profile may be associated with a specific user and may define custom locations and/or actions associated with one or more virtual controls. In some embodiments, the memory 308 also contains program code that, when executed by the processor 202, causes the multi-mode input controller 106 to determine an arrangement of the first body 204 and the second body 208, receive input, and alter operation of the multi-mode input controller 106 based on the determined arrangement.

The protocol module 314, in one embodiment, is configured to select a communication protocol, for communicating with an external device, based on the arrangement of the first body 204 and the second body 208. In some embodiments, the protocol module 314 is component of the operating mode module 214. In other embodiments, the protocol module 314 operates separately from the operating mode module 214. In some embodiments, the protocol module 314 receives input commands, for example from the processor 202, and formats the input commands into one or more control signals that conform to the selected communication protocol. In some embodiments, the protocol module 314 determines that the arrangement of the multi-mode input controller 106 has changed and selects a new communication protocol based on the new arrangement. For example, the protocol module 314 may receive an indication from the processor 202, the orientation module 212, and/or one or more sensors in the multi-mode input controller 106 indicating that the arrangement of the multi-mode input controller 106 has changed.

The bias member 316, in one embodiment, is configured to maintain the first body 204 and the second body 208 is one or more predetermined arrangements. In some embodiments, the bias member 316 is operatively coupled to the orientation module 212 and assists in determining the arrangement of the first body 204 and the second body 208. In further embodiments, the bias member 316 may provide an indication of orientation and/or arrangement to the orientation module 212. For example, the bias member 316 may be combined with one or more sensors that determine angle, proximity, or the like.

In some embodiments the bias member 316 includes one or more of a spring, a detent, a magnet, a latch, or the like. In some embodiments, the bias member 316 includes a magnet and a magnetic sensor. When the multi-mode input controller 106 is in a closed arrangement (i.e., the first body 204 is arranged flush against the second body 208 and/or parallel to the second body 208) the magnet may retain the first body 204 against the second body 208 and the magnetic sensor may register that the first body 204 is against the second body 208. When the first body 204 is rotated away from the second body 208, the magnetic sensor may register that the first body 204 is no longer against the second body 208.

FIGS. 4A1-4A2 are diagrams depicting perspective views of an apparatus 400 for providing input via a selectively arrangeable, multi-mode input controller, according to embodiments of the disclosure. The apparatus 400 may be similar to the multi-mode input controller 106 discussed above with reference to FIGS. 2-3. The apparatus 400 includes a first body 204, a second body 208, and a hinge 402. The hinge 402, according to one embodiment, rotatably connects the first body 204 to the second body 208.

In some embodiments, the hinge 402 is permanently attached to the first body 204 and the second body 208. In other embodiments, the hinge 402 is detachably coupled to the first body 204 and the second body 208. In further embodiments, the first body 204 and the second body 208 are independently operable input devices coupled via the hinge 402 to operate as a single input device. In some embodiments, the hinge 402 also communicatively couples the first body 204 to the second body 208 using wired and/or wireless connections. In some embodiments, the hinge 402 may include one or more sensors for detecting an arrangement of the first body 204 with respect to the second body 208.

In the embodiments of FIGS. 4A1-4A2, the first body 204 and the second body 208 each include a touch panel embedded in their upper surfaces. When the apparatus 400 is arranged in a first arrangement, the touch panels may operate in a first mode. When the apparatus 400 is arranged in a second arrangement, the touch panels may operate in a second mode. The apparatus 400 may detect a transition from the first arrangement to the second arrangement (or vice versa) and switch the operating mode to correspond to the arrangement.

FIG. 4A1 is a diagram illustrating a top perspective view of the apparatus 400 arranged in the first arrangement. The first arrangement is a closed arrangement where the first body 204 is arranged flush against the second body 208. When in the first arrangement (i.e., operating in the first mode), the apparatus 400 functions as a touchpad pointer device that translates finger motion into pointer (cursor) movements. In certain embodiments, the apparatus 400 may operate as a multi-touch touchpad that interprets gestures to implement advanced commands, when operating in the first mode.

In some embodiments, the first body 204 and the second body 208 include touch panels with thin bezels to minimize areas along the boundary 404 where touch cannot be sensed. In further embodiments, the second body 208 may become an extension of the first body 204 so that finger movements crossing the boundary 404 between the first body 204 and the second body 208 are interpreted as continuous movement. Additionally, while in the first arrangement, the apparatus 400 is configured to send pointer control signals to an external device, such as a laptop, desktop, or other computing system.

FIG. 4A2 is a diagram illustrating a top perspective view of the apparatus 400 arranged in a second arrangement, according to embodiments of the disclosure. The second arrangement is an extended arrangement where the first body 204 is pulled away at a corner from the second body 208 to form a shape similar to a video game controller. When in the second arrangement, the apparatus 400 functions as a gaming controller having a plurality of left controls 406 and a plurality of right controls 408. The left controls 406 and the right controls 408 are virtual controls and may include one or more of a joystick, a directional pad or direction button, action buttons, and the like.

In some embodiments, the virtual controls are indicated by a display, a light, or another indicator that is embedded with the touch panel. Accordingly, the left controls 406 and the right controls 408 may be visible when in the apparatus 400 is in the second mode but not when in the first mode. In certain embodiments, when the apparatus 400 operates in the second mode, the apparatus 400 may only respond to touch in the areas of the left controls 406 and/or the right controls 408.

When the apparatus 400 operates in the second mode, the apparatus 400 is configured to send gaming control signals to an external device, such as a video gaming console. The apparatus 400 may be configurable to operate with a variety of game console. In some embodiments, the apparatus 400 includes a transceiver capable of communicating directly with a gaming console. In other embodiments, the apparatus 400 may communicate with the gaming console via a repeater. In further embodiments, the repeater may convert control signals sent by the apparatus 400 into control signals receivable by the gaming console. For example, the apparatus 400 may send radio frequency signals in a first radio band that are converted into signals in a different radio band. In some embodiments, the apparatus 400 may also have a sensor for detecting spatial movement of the apparatus 400, such as an optical sensor, a gyroscopic sensor, or the like, and may provide control signals to a gaming console based on the spatial movement.

FIGS. 4B1-4B2 are diagrams depicting perspective views of an apparatus 420 for providing input via a selectively arrangeable, multi-mode input controller, according to embodiments of the disclosure. The apparatus 420 may be similar to the multi-mode input controller 106 and/or the apparatus 400 discussed above with reference to FIGS. 2-3, 4A1, and 4A2. The apparatus 420 includes a first body 204, a second body 208, and a hinge 402 that rotatably connects the first body 204 to the second body 208. In certain embodiments, the first body 204 and the second body 208 are not symmetrical with respect to each other, as shown in FIGS. 4B1-4B2.

The hinge 402, according to one embodiment, rotatably connects the first body 204 to the second body 208. In some embodiments, the hinge 402 is permanently attached to the first body 204 and the second body 208. In other embodiments, the hinge 402 is detachably coupled to the first body 204 and the second body 208. In further embodiments, the first body 204 and the second body 208 are independently operable input devices coupled via the hinge 402 to operate as a single input device. In some embodiments, the hinge 402 also communicatively couples the first body 204 to the second body 208 using wired and/or wireless connections. In some embodiments, the hinge 402 may include one or more sensors for detecting an arrangement of the first body 204 with respect to the second body 208.

In the embodiments of FIGS. 4B1-4B2, the first body 204 and the second body 208 each include a touch panel embedded in their upper surfaces. When the apparatus 420 is arranged in a first arrangement, the touch panels may operate in a first mode. When the apparatus 420 is arranged in a second arrangement, the touch panels may operate in a second mode. The apparatus 420 may detect a transition from the first arrangement to the second arrangement (or vice versa) and switch the operating mode to correspond to the arrangement.

FIG. 4B1 is a diagram illustrating a top perspective view of the apparatus 420 arranged in the first arrangement. The first arrangement is a closed arrangement where the first body 204 is arranged flush against the second body 208. When in the first arrangement, the apparatus 420 functions as a remote control device having a plurality of first controls 422. The apparatus 420 may also have a sensor for detecting motion of the apparatus 420, such as an optical sensor, a gyroscopic sensor, or the like.

The first controls 422 are virtual controls indicated by a display, a light, or another indicator that is embedded with the touch panel. Accordingly, the first controls 422 may be visible when in the apparatus 420 is in the first mode but not when in the second mode. The first controls 422 may include one or more of channel adjustment buttons, volume adjustment buttons, a keypad, a play button, a stop button, a search button, and the like. In certain embodiments, when the apparatus 420 operates in the first mode, the apparatus 420 may only respond to touch in the areas of the first controls 422.

In some embodiments, the first controls 422 overlap may include one or more overlapping controls 424 that overlay the boundary 404 between the first body 204 and the second body 208 with a first portion of the overlapping controls 424 on the first body 204 and a second portion of the overlapping controls 424 on the second body 208. In such embodiments, the apparatus 420 coordinates input between the first body 204 and the second body 208 so that the first portion and the second portion act as a single control. In some embodiments, the first body 204 and the second body 208 include touch panels with thin bezels to minimize areas along the boundary 404 where touch cannot be sensed.

In some embodiments, the apparatus 420 may act as a universal remote control for controlling one or more of a television, an optical disc player, an audio system, a video system, a home theatre, or the like. In some embodiments, the apparatus 420 includes a transceiver capable of communicating directly with a television, optical disc player, etc. In other embodiments, the apparatus 420 may communicate via an external adapter that converts control signals sent by the apparatus 420 into control signals receivable by the television, optical disc player, etc. For example, the apparatus 420 may send radio frequency signals which are converted by the adapter into infrared signals receivable by the television, optical disc player, etc.

FIG. 4B2 is a diagram illustrating a top perspective view of the apparatus 420 arranged in a second arrangement, according to embodiments of the disclosure. The second arrangement is an extended arrangement where the second body 208 is pulled away at a corner from the first body 204 to form a shape similar to a video game controller. When in the second arrangement, the apparatus 420 functions as a gaming controller having a plurality of left controls 406 and a plurality of right controls 408. In some embodiments, the left controls 406 and the right controls 408 are virtual controls indicated by a display, a light, or another indicator that is embedded with the touch panel. In further embodiments, the left controls 406 and right controls 408 may be visible when in the apparatus 420 is in the second mode but not when in the first mode. In certain embodiments, when the apparatus 420 operates in the second mode, the apparatus 420 may only respond to touch in the areas of left controls 406 and/or the right controls 408.

When the apparatus 420 operates in the second mode, the apparatus 420 is configured to send gaming control signals to an external device, such as a video gaming console. The apparatus 420 may be configurable to operate with a variety of game console. In some embodiments, the apparatus 420 includes a transceiver capable of communicating directly with a gaming console. In other embodiments, the apparatus 420 may communicate with the gaming console via a repeater. In some embodiments, the apparatus 420 may also have a sensor for detecting spatial movement of the apparatus 420, such as an optical sensor, a gyroscopic sensor, or the like, and may provide control signals to a gaming console based on the spatial movement.

FIGS. 4C1-4C3 are diagrams depicting perspective views of an apparatus 440 for providing input via a selectively arrangeable, multi-mode input controller, according to embodiments of the disclosure. The apparatus 440 may be similar to the multi-mode input controller 106, the apparatus 400, and/or the apparatus 420 discussed above with reference to FIGS. 2-3, 4A1, 4A2, 4B1, and 4B2. The apparatus 440 includes a first body 204 having a first axis 442 and a second body 208 having a second axis 444. In the embodiments of FIGS. 4C1-4C3, the first body 204 and the second body 208 each include a touch panel embedded in their upper surfaces. When the apparatus 440 is arranged in a first arrangement, the touch panels may operate in a first mode. When the apparatus 440 is arranged in a second arrangement, the touch panels may operate in a second mode. The apparatus 440 may detect a transition from the first arrangement to the second arrangement (or vice versa) and switch the operating mode to correspond to the arrangement.

FIG. 4C1 is a diagram illustrating a top perspective view of an apparatus 440 arranged in the first arrangement. The first arrangement is a closed arrangement where a long side the first body 204 is arranged flush against a long side of the second body 208 with the first axis 442 parallel to the second axis 444. When in the first arrangement, the apparatus 440 functions as a mouse-like pointer device having a left click region 446 and a right-click region 448. The apparatus 440 may also have a sensor for detecting lateral movement of the apparatus 440, such as an optical sensor, a gyroscopic sensor, or the like. In certain embodiments, when the apparatus 440 operates in the first mode, the apparatus 440 may only respond to touch in the areas of the left click region 446 and/or the right click region 448. When the apparatus 440 operates in the first mode, the apparatus 440 is configured to send pointer control signals to an external device, such as a laptop, desktop, or other computing system.

FIG. 4C2 is a diagram illustrating a top perspective view of the apparatus 440 arranged in a second arrangement, according to embodiments of the disclosure. The second arrangement is an extended arrangement where the first body 204 is pulled from the second body 208 to form a shape similar to a video game controller. In some embodiments, the first axis 442 and the second axis 444 form a right or acute angle when in the second arrangement. In further embodiments, the angle between the first axis 442 and the second axis 444 is user defined, the user arranging the first body 204 and the second body 208 at a comfortable angle.

In some embodiments, the second arrangement includes a range of angles between the first axis 442 and the second axis 444.

When in the second arrangement, the apparatus 440 functions as a gaming controller having a plurality of left controls 406 and a plurality of right controls 408. The left controls 406 and right controls 408 are virtual controls and may include one or more of a joystick, a directional pad or direction button, and action buttons. The apparatus 440 may be configured to automatically align the joystick, directional pad, and/or action buttons with an "up" orientation. For example, if the first axis 442 is at a 60 degree angle relative to the second axis 444, a joystick on the first body 204 may be aligned to 30 degree counter-clockwise offset to the first axis 442 and a joystick on the second body 208 may be aligned to 30 degree clockwise offset to the second axis 444.

In some embodiments, the virtual controls are indicated by a display, a light, or another indicator that is embedded with the touch panel. In further embodiments, the virtual controls may be visible when in the apparatus 440 is in the second mode but not when in the first mode. In certain embodiments, when the apparatus 440 operates in the second mode, the apparatus 440 may only respond to touch in the areas of the left controls 406 and/or the right controls 408.

When the apparatus 440 operates in the second operating mode, the apparatus 440 is configured to send gaming control signals to an external device, such as a video gaming console. The apparatus 440 may be configurable to operate with a variety of game console. In some embodiments, the apparatus 440 includes a transceiver capable of communicating directly with a gaming console. In other embodiments, the apparatus 440 may communicate with the gaming console via a repeater. In some embodiments, the apparatus 440 may also have a sensor for detecting spatial movement of the apparatus 440, such as a gyroscopic sensor or the like, and may provide control signals to a gaming console based on the spatial movement.

FIG. 4C3 is a diagram illustrating a side perspective view of the apparatus 440, according to embodiments of the disclosure. The apparatus 440 may have a wedge-shaped profile where one end is thicker than the other to improve ergonomic. In some embodiments, one or more buttons 450 may be present on a side of the first body 204 and/or the second body 208. While the depicted embodiment shows a pair of buttons 446 on a side of the first body 204, more buttons or fewer buttons may exists on the first body 204. In some embodiments, the underside of the apparatus 440 includes various contours to improve the ergonomics. In further embodiments, the contours are detachable. In some embodiments, the contours are made from a firm, hard material, such as an ABS plastic. In some embodiments, the contours include a soft gripping material, such as a synthetic rubber.

In some embodiments, the apparatus 440 has a third arrangement with a short side of the first body 204 arranged flush against a short side of the second body 208 with the first body 204 arranged parallel to the second body 208. In such embodiments, the apparatus 440 may have a third operating mode. For example, the apparatus 440 may be configured to function as a universal remote control for controlling an electronic device (e.g., a television, an audio/video player, etc.). The apparatus 440 may display a third set of virtual controls when in the third arrangement (e.g., operating in the third operating mode), for example, one or more of channel adjustment buttons, volume adjustment buttons, a keypad, a play button, a stop button, a search button, and the like.

Figure 5:
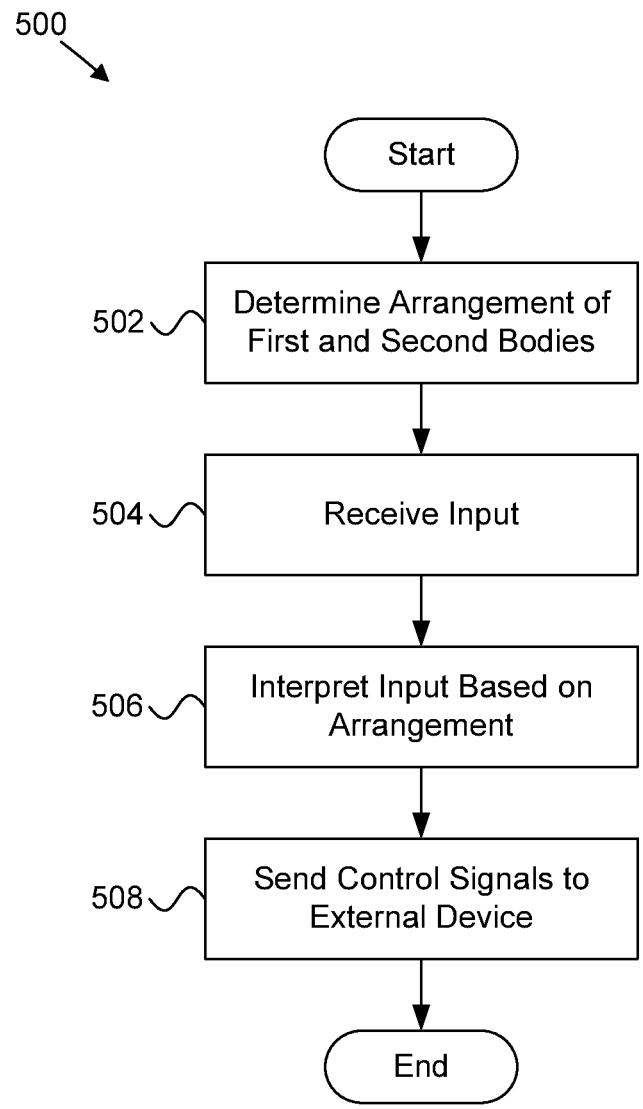
FIG. 5 is a schematic flow chart diagram illustrating one embodiment of a method for providing input via a selectively arrangeable, multi-mode input controller.

FIG. 5 depicts a method 500 for providing input via a selectively arrangeable, multi-mode input controller, according to embodiments of the disclosure. In some embodiments, the method 500 is performed by an electronic device, such as the multi-mode input controller 106 described above with reference to FIGS. 1-3. In further embodiments, the method 500 is performed by a processor, such as the processor 202 described above with reference to FIGS. 2-3.

The method 500 begins with the electronic device determining 502 an arrangement of a first body with respect to a second body. In some embodiments, the first body is pivotably connected to the second body, and one or more sensor may be used to determine 502 the arrangement of the first and second bodies. The one or more sensors may determine 502 between two or more discrete arrangements. For example, the one or more sensors may be used to determine 502 whether the first and second bodies are in a first arrangement or a second arrangement. In the first arrangement, a first edge of the first body may be adjacent to a second edge of the second body. In the second arrangement, the first edge may be positioned away from the second edge. In some embodiments, the one or more sensors may include a magnetic sensor, an optical or infrared sensor, an electronic switch, and the like. In further embodiments, the one or more sensors may measure an angle between the first and second bodies, a distance between the first and second bodies, and the like.

Next, the electronic device receives 504 an input. In some embodiments, the input is received 504 from the first body. In some embodiments, the input is received 504 by the second body. In further embodiments, input may be received 504 simultaneously, or near simultaneously, from both the first body and the second body. The input may indicate that one or more controls have been pressed. In some embodiments, the one or more controls are physical controls, such as buttons, keys, switches, and the like. In some embodiments, the one or more controls are virtual control, such as an image of a button, key, and or switch on a touchscreen or touch-sensitive panel. In some embodiments, the input is a gesture.

Next, the electronic device interprets 506 the input based on the arrangement of the first and second bodies. In some embodiments, an input profile associated with the particular arrangement, or orientation, of the first and second bodies is used to interpret 506 the input. The input profile may map user input (e.g., finger motion, gestures, and/or button presses) to specific functions, commands, actions, and/or routines. For example, a remote control profile may be associated with a first arrangement and the electronic device may interpret 506 touch, finger motion, gestures, and/or button presses as remote control commands. As another example, a gaming controller profile may be associated with a second arrangement and the electronic device may interpret 506 touch, finger motion, gestures, and/or button presses as movement commands and/or action commands.

In some embodiments, the interpreting 506 input includes comparing received input to a particular library of available input commands to determine an input commands corresponding to the user's input, the particular library selected based on the arrangement, or orientation, of the first and second bodies. In certain embodiments, the interpreted input is used to form input commands for an external device. In some embodiments, the input profile defines a sensitivity or resolution for the electronic device. For example, one input profile may define a high resolution to detect fine finger movement while another input profile may define a low resolution to detect rough finger movement.

In some embodiments, the electronic device may perform a first function while in a first arrangement and a second function while in a second arrangement of the first and second bodies. For example, the electronic device may function as a touch pad or gesture pad while in the first arrangement and as a gaming controller while in the second arrangement. Accordingly, the electronic device may interpret 506 an input as a pointing-device command or a gesture command while in the first arrangement and as a gamepad command while in the second arrangement. In another example, the electronic device may function as a remote control while in the first arrangement and as a gaming controller while in the second arrangement. Accordingly, the electronic device may interpret 506 an input as a set-top box command while in the first arrangement and as a gamepad command while in the second arrangement.

Next, the electronic device sends 508 control signals to an external device responsive to interpreting 506 the input. The control signals include input commands that contain the interpreted input. In some embodiments, sending 508 control signals may include selecting a signaling protocol and/or a frequency for the control signals based on the arrangement of the first and second bodies. In further embodiments, sending 508 control signals may include selecting the external device from a plurality of external devices based on the arrangement of the first and second bodies. Thus, sending 508 control signals may include sending first control signals suitable for controlling a first device in response to the first and second bodies being arranged in a first configuration, and sending second control signals suitable for controlling a second device, different than the first device, in response to the first and second bodies being arranged in a second configuration. The method 500 ends.

In some embodiments, the method 500 may also include displaying a virtual control based on the arrangement of the first and second bodies and reconfiguring the virtual control in response to a change in the arrangement of the first and second bodies. In some embodiments, the first body comprises a first touch panel and the second body comprises a second touch panel, the method further comprising configuring the second touch panel as a continuation of the first touch panel in response to the first and second bodies being arranged in a first configuration.

Figure 6:
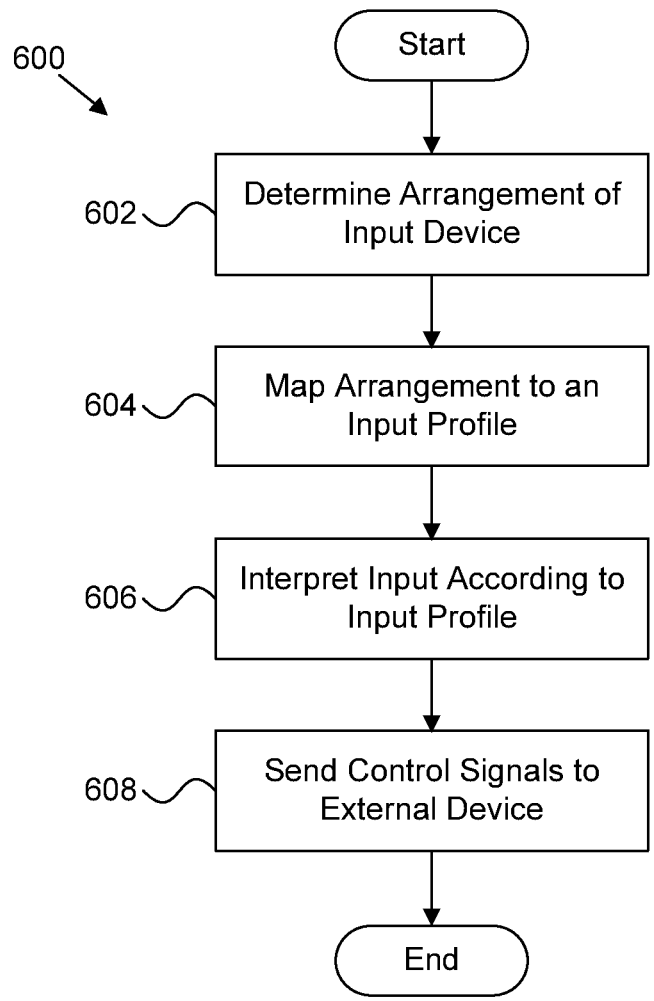
FIG. 6 is a schematic flow chart diagram illustrating another embodiment of a method for providing input via a selectively arrangeable, multi-mode input controller.

FIG. 6 is a schematic flow chart diagram illustrating another embodiment of a method for providing input via a selectively arrangeable, multi-mode input controller. In some embodiments, the method 600 is performed by an electronic device, such as the multi-mode input controller 106 described above with reference to FIGS. 1-3. In further embodiments, the method 600 is performed by a processor, such as the processor 202 described above with reference to FIGS. 2-3.

The method 600 begins with the electronic device determining 602 an arrangement of a first body with respect to a second body. In some embodiments, the first body is pivotably connected to the second body, and one or more sensor may be used to determine 602 the arrangement of the first and second bodies. The one or more sensors may determine 602 between two or more discrete arrangements. For example, the one or more sensors may be used to determine 602 whether the first and second bodies are in a first arrangement or a second arrangement. In the first arrangement, a first edge of the first body may be adjacent to a second edge of the second body. In the second arrangement, the first edge may be pulled away from the second edge. In some embodiments, the one or more sensors may include a magnetic sensor, an optical or infrared sensor, an electronic switch, and the like. In further embodiments, the one or more sensors may measure an angle between the first and second bodies, a distance between the first and second bodies, and the like.

Next, the electronic device maps 604 the determined arrangement to an input profile. In some embodiments, a plurality of input profile may exist, each input profile corresponding to a particular arrangement of the first and second bodies. The input profile may associate user input (e.g., finger motion, gestures, and/or button presses) with specific functions, commands, actions, and/or routines. For example, a pointing device profile may be mapped 604 to a first arrangement and may associate user input with pointer commands. As another example, a gaming controller profile may be mapped 604 to a second arrangement and may associated user input with movement commands and/or action commands.

Next, the electronic device interprets 606 the input based on the mapped input profile. In some embodiments, parameters from the input profile are used to interpret 606 touch, finger motion, gestures, and/or button presses. In further embodiments, the input is compared to a particular library of available input commands to determine an input commands corresponding to the user's input, the particular library defined by the input profile. In certain embodiments, the interpreted input is used to form input commands for an external device.

In some embodiments, a first input profile may correspond to a first function of the electronic device and a second input profile may correspond to a second function of the electronic device. For example, the electronic device may function as a touch pad or pointing device while using the first input profile and as a gaming controller while using the second input profile. Accordingly, the electronic device may interpret 606 an input as a pointing-device command or a gesture command while using the first input profile and as a gamepad command while using the second input profile. In another example, the electronic device may function as a remote control while using the first input profile and as a gaming controller while using the second input profile. Accordingly, the electronic device may interpret 606 an input as an audio/video device command while using the first input profile and as a gamepad command while using the second input profile.

Next, the electronic device sends 608 control signals to an external device responsive to interpreting the input. The control signals include input commands that contain the interpreted input. In some embodiments, sending 608 control signals may include selecting a signaling protocol and/or a frequency for the control signals based on the arrangement of the first and second bodies. In further embodiments, sending 608 control signals may include selecting the external device from a plurality of external devices based on the arrangement of the first and second bodies. Thus, sending 608 control signals may include sending first control signals suitable for controlling a first device in response to the first and second bodies being arranged in a first configuration, and sending second control signals suitable for controlling a second device, different than the first device, in response to the first and second bodies being arranged in a second configuration. The method 600 ends.

In some embodiments, the method 600 may also include displaying a virtual control based on the arrangement of the first and second bodies and reconfiguring the virtual control in response to a change in the arrangement of the first and second bodies. In some embodiments, the first body comprises a first touch panel and the second body comprises a second touch panel, the method further comprising configuring the second touch panel as a continuation of the first touch panel in response to the first and second bodies being arranged in a first configuration.

Figure 7:
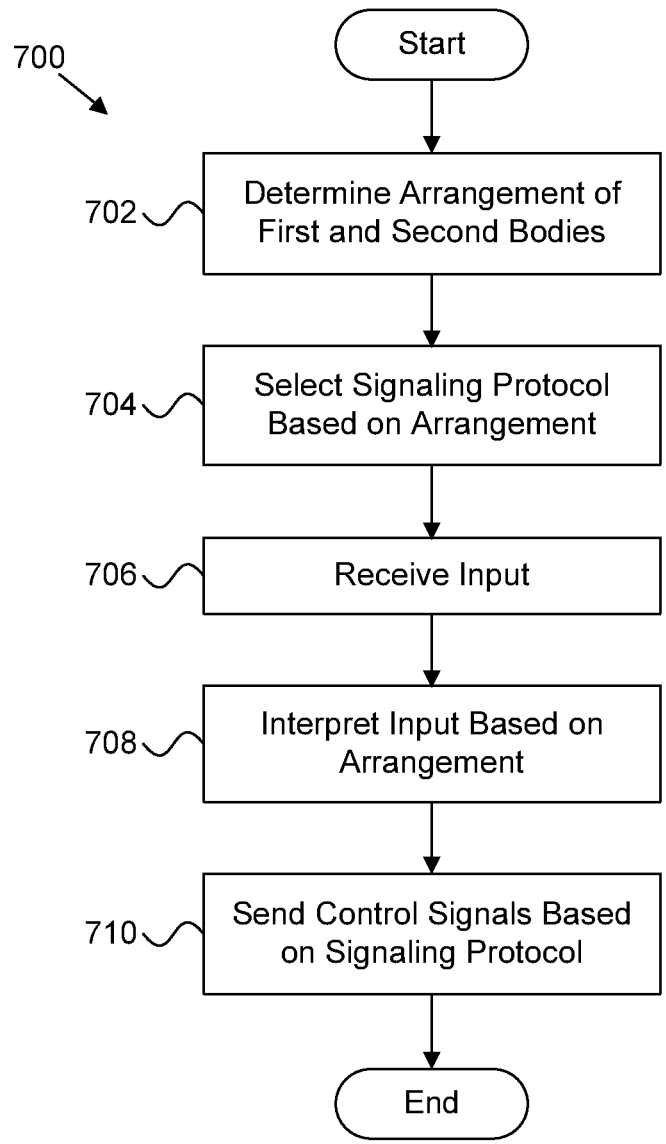
FIG. 7 is a schematic flow chart diagram illustrating another embodiment of a method for providing input via a selectively arrangeable, multi-mode input controller.

FIG. 7 is a schematic flow chart diagram illustrating another embodiment of a method for providing input via a selectively arrangeable, multi-mode input controller. In some embodiments, the method 700 is performed by an electronic device, such as the multi-mode input controller 106 described above with reference to FIGS. 1-3. In further embodiments, the method 700 is performed by a processor, such as the processor 202 described above with reference to FIGS. 2-3.

The method 700 begins with the electronic device determining 702 an arrangement of a first body with respect to a second body. In some embodiments, the first body is pivotably connected to the second body, and one or more sensor may be used to determine 702 the arrangement of the first and second bodies. The one or more sensors may determine 702 between two or more discrete arrangements. For example, the one or more sensors may be used to determine 702 whether the first and second bodies are in a first arrangement or a second arrangement. In the first arrangement, a first edge of the first body may be adjacent to a second edge of the second body. In the second arrangement, the first edge may be positioned away from the second edge. In some embodiments, the one or more sensors may include a magnetic sensor, an optical or infrared sensor, an electronic switch, and the like. In further embodiments, the one or more sensors may measure an angle between the first and second bodies, a distance between the first and second bodies, and the like.

Next, the electronic device selects 704 a signaling protocol based on arrangement of the first and second bodies. In some embodiments, the signaling protocol may be selected 704 based on a function associated with the arrangement. For example, a signaling protocol suitable for communicating with a television, an optical disc player, set-top box, or the like, may be selected 704 for an arrangement associated with a remote control function. In some embodiments, the signaling protocol defines a data format, a packet structure, a modulation, and/or a waveform used for control signals sent to the external device. In further embodiments, the signaling protocol defines an amplitude, a frequency band, a communication link, or the like, associated with the control signals.

Next, the electronic device receives 706 an input. In some embodiments, the input is received 706 from the first body. In some embodiments, the input is received 706 by the second body. In further embodiments, input may be received 706 simultaneously, or near simultaneously, from both the first body and the second body. The input may indicate that one or more controls have been pressed. In some embodiments, the one or more controls are physical controls, such as buttons, keys, switches, and the like. In some embodiments, the one or more controls are virtual control, such as an image of a button, key, and or switch on a touchscreen or touch-sensitive panel. In some embodiments, the input is a gesture.

Next, the electronic device interprets 708 the input based on the arrangement of the first and second bodies. In some embodiments, an input profile associated with the particular arrangement, or orientation, of the first and second bodies is used to interpret 708 the input. The input profile may map user input (e.g., finger motion, gestures, and/or button presses) to specific functions, commands, actions, and/or routines. For example, a remote control profile may be associated with a first arrangement and the electronic device may interpret 708 touch, finger motion, gestures, and/or button presses as remote control commands. As another example, a gaming controller profile may be associated with a second arrangement and the electronic device may interpret 708 touch, finger motion, gestures, and/or button presses as movement commands and/or action commands.

In further embodiments, interpreting 708 input includes comparing received input to a particular library of available input commands to determine an input commands corresponding to the user's input, the particular library selected based on the arrangement, or orientation, of the first and second bodies. In certain embodiments, the interpreted input is used to form input commands for an external device. In some embodiments, the input profile defines a sensitivity or resolution for the electronic device. For example, one input profile may define a high resolution to detect fine finger movement while another input profile may define a low resolution to detect rough finger movement.

In some embodiments, the electronic device may perform a first function while in a first arrangement and a second function while in a second arrangement of the first and second bodies. For example, the electronic device may function as a touch pad or gesture pad while in the first arrangement and as a gaming controller while in the second arrangement. Accordingly, the electronic device may interpret 708 input as a pointing-device command or a gesture command while in the first arrangement and as a gamepad command while in the second arrangement. In another example, the electronic device may function as a remote control while in the first arrangement and as a gaming controller while in the second arrangement. Accordingly, the electronic device may interpret 708 input as an audio-visual device command while in the first arrangement and as a gamepad command while in the second arrangement.

Next, the electronic device sends 710 control signals to an external device responsive to interpreting the input. The control signals include input commands that contain the interpreted input. In some embodiments, sending 710 control signals may include selecting the external device from a plurality of external devices based on the arrangement of the first and second bodies. Thus, sending 710 control signals may include sending first control signals suitable for controlling a first device in response to the first and second bodies being arranged in a first configuration, and sending second control signals suitable for controlling a second device, different than the first device, in response to the first and second bodies being arranged in a second configuration. The method 700 ends.

In some embodiments, the method 700 may also include displaying a virtual control based on the arrangement of the first and second bodies and reconfiguring the virtual control in response to a change in the arrangement of the first and second bodies. In some embodiments, the first body comprises a first touch panel and the second body comprises a second touch panel, the method further comprising configuring the second touch panel as a continuation of the first touch panel in response to the first and second bodies being arranged in a first configuration.

Figure 8:
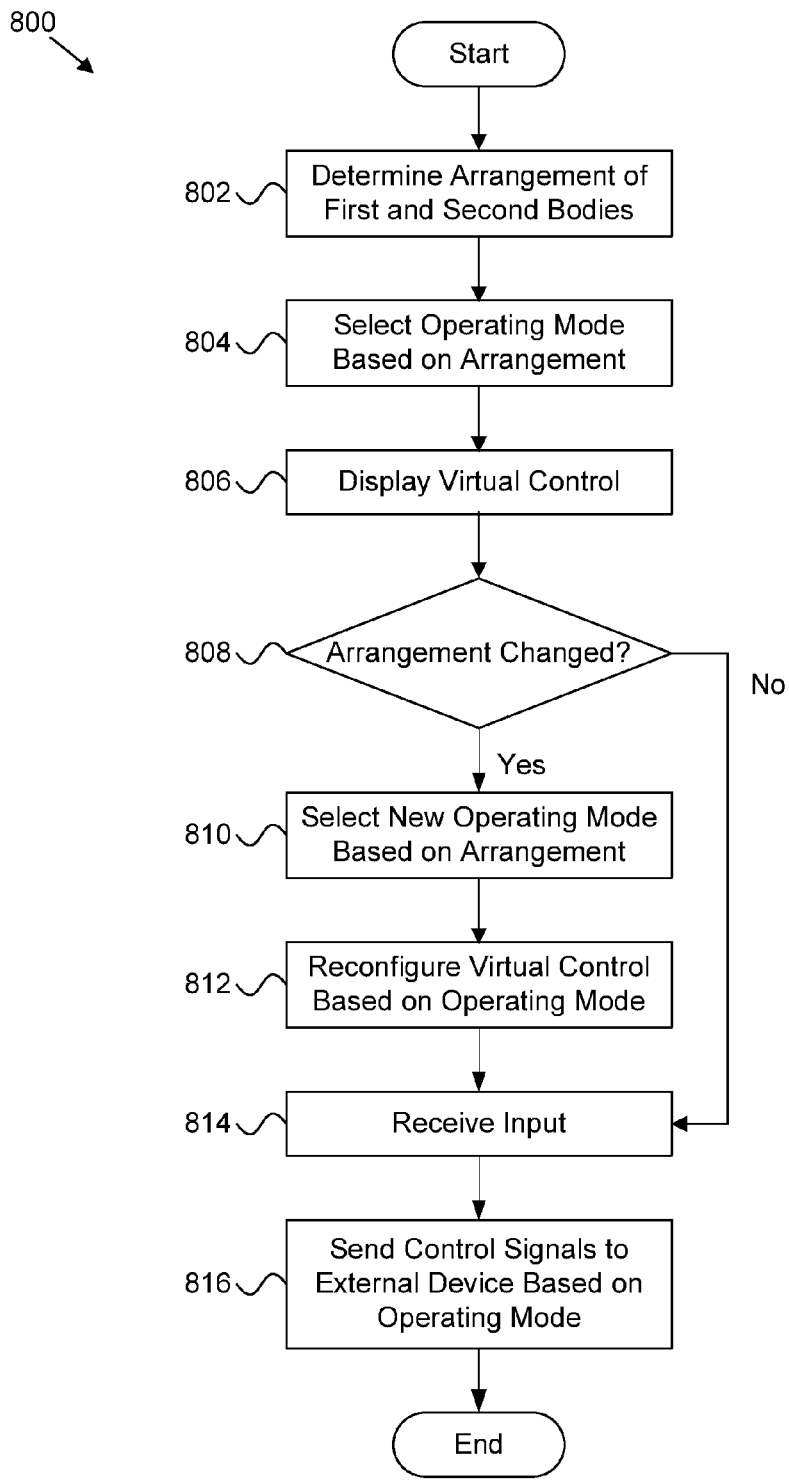
FIG. 8 is a schematic flow chart diagram illustrating another embodiment of a method for providing input via a selectively arrangeable, multi-mode input controller.

FIG. 8 is a schematic flow chart diagram illustrating another embodiment of a method for providing input via a selectively arrangeable, multi-mode input controller. In some embodiments, the method 800 is performed by an electronic device, such as the multi-mode input controller 106 described above with reference to FIGS. 1-3. In further embodiments, the method 800 is performed by a processor, such as the processor 202 described above with reference to FIGS. 2-3.

The method 800 begins with the electronic device determining 802 an arrangement of a first body with respect to a second body. In some embodiments, the first body is pivotably connected to the second body, and one or more sensor may be used to determine 802 the arrangement of the first and second bodies. The one or more sensors may determine 802 between two or more discrete arrangements. For example, the one or more sensors may be used to determine 802 whether the first and second bodies are in a first arrangement or a second arrangement. In the first arrangement, a first edge of the first body may be adjacent to a second edge of the second body. In the second arrangement, the first edge may be positioned away from the second edge. In some embodiments, the one or more sensors may include a magnetic sensor, an optical or infrared sensor, an electronic switch, and the like. In further embodiments, the one or more sensors may measure an angle between the first and second bodies, a distance between the first and second bodies, and the like.

Next, the electronic device selects 804 an operating mode based on the arrangement of the first and second bodies. In some embodiments, a plurality of operating modes may exist, each operating mode corresponding to a particular arrangement of the first and second bodies. The operating mode may include settings, parameters, and/or other configurations that cause the electronic device to operate in a particular manner. In further embodiments, the operating mode defines a first set of virtual controls (and their locations), a first input profile for interpreting input, a first set of communication protocols for sending control signals, and/or a first external device to which the control signals are sent. In some embodiments, a first operating mode is associated with a first arrangement of the electronic device and a second operating mode is associated with a second arrangement of the electronic device. For example, a pointing device mode causing the electronic device to function as a pointing device may be associated with a first arrangement. As another example, a gaming controller mode causing the electronic device to function as a gaming controller may be associated with a second arrangement.

Next, the electronic device displays 806 one or more virtual controls on the first body and/or second body. The virtual controls may be indications of keys, buttons, and/or other controls that a user presses to provide input. The virtual controls may be indicated by a display, a light, or another indicator that is embedded with the touch panel. In some embodiments, the virtual controls display 806 an image of a button, key, and or switch on a touchscreen or touch-sensitive panel. In some embodiments, the virtual controls (including their locations and functions) are based on the selected operating mode. For example, one operating mode may define a set of virtual controls including a joystick, a directional pad or direction button, action buttons, and the like, and another operating mode may define another set of virtual controls including channel adjustment buttons, volume adjustment buttons, a keypad, a play button, a stop button, a search button, and the like.

The electronic device determines 808 whether the arrangement of the first and second bodies has changed. Changes in arrangement may be detected using one or more sensors operatively connected to the first body and/or second body. In some embodiments, a value indicative of a last known arrangement may be stored in memory and the electronic device may periodically compare the current arrangement to the last known arrangement to detect a change.

If the electronic device determines 808 that the arrangement has changed, the electronic device selects 810 a new operating mode based on the new arrangement and reconfigures 812 the virtual controls based on the new operating mode. However, if the electronic device determines 808 that the arrangement has not changed, the does not change the operating mode or the virtual controls.

The electronic device 814 receives input from a user. In some embodiments, the input is received 814 from the first body. In some embodiments, the input is received 814 by the second body. In further embodiments, input may be received 814 simultaneously, or near simultaneously, from both the first body and the second body. The input may indicate that one or more controls have been pressed. In some embodiments, the one or more controls are physical controls, such as buttons, keys, switches, and the like. In some embodiments, the one or more controls are virtual control, such as an image of a button, key, and or switch on a touchscreen or touch-sensitive panel. In some embodiments, the input is a gesture. In some embodiments, the input may be interpreted using an input profile associated with the selected operating mode. For example, parameters from the input profile may be used to interpret 606 touch, finger motion, gestures, and/or button presses.

Next, the electronic device sends 816 control signals to an external device based on the operating mode. The control signals include input commands that based on the received input. In some embodiments, sending 816 control signals may include selecting a signaling protocol and/or a frequency for the control signals based on the operating mode. A different signaling protocol may be selected in response to a change in the operating mode. In further embodiments, sending 816 control signals may include selecting the external device from a plurality of external devices based on the operating mode. Thus, sending 816 control signals may include sending first control signals suitable for controlling a first device while in a first operating mode, and sending second control signals suitable for controlling a second device, different than the first device, in response to the first and second bodies being in a second operating mode. The method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a first body having a first input device that receives user input;
   a second body pivotably connected to the first body and having a second input device that receives user input;
   a memory that stores code executable by the processor to:
   receive user input from at least one of the first user input device and the second user input device;
   determine an orientation of the first body with respect to the second body;
   generate input commands to control an external device based on the user input and further based on the orientation of the first body with respect to the second body; and
   send the control signals to an external device.

2. The apparatus of claim 1, further comprising an angle sensor operatively coupled to the first body and the second body that determines an angle between the first body and the second body, wherein receiving indication of an orientation comprises the processor determining the orientation based on the determined angle.

3. The apparatus of claim 1, wherein the first input device comprises a first touchscreen display and the second input device comprises a second touchscreen display.

4. The apparatus of claim 1, further comprising:
   a transmitter that sends the input commands to the external device; and
   a protocol module that selects a signaling protocol based on the arrangement of the first body and the second body.

5. The apparatus of claim 1, further comprising a bias member that maintains the first body and the second body in a first configuration, wherein the first input device and the second input device process input in a first manner in response to the apparatus being in the first configuration.

6. The apparatus of claim 5, wherein the bias member further comprises a magnet that maintains the first body adjacent to the second body.

7. The apparatus of claim 1, further comprising a bias member that urges the first body and the second body into a predetermined arrangement.

8. The apparatus of claim 1, wherein the first input device comprises a first touch panel and the second input device comprises a second panel, wherein the second touch panel acts as a continuation of the first touch panel in response to the apparatus being arranged in a first configuration.

9. The apparatus of claim 8, wherein the apparatus is configured as a touch panel pointing device in response to the first body and the second body being arranged in the first configuration.

10. The apparatus of claim 1, wherein the apparatus is configured as a gaming controller in response to the first body and the second body being arranged in an extended configuration.

11. The apparatus of claim 1, wherein the apparatus is configured as a remote control in response to the first body and the second body being arranged in a closed configuration.

12. A method comprising:
    determining an arrangement of a first body with respect to a second body, the first body pivotably connected to the second body, wherein the first body includes a first user input device and the second body includes a second user input device;
    receiving user input from at least one of the first user input device and the second user input device;
    generating control signals, by use of a processor, from the user input based on the arrangement of the first and second bodies, wherein generating control signals comprises generating input commands specific to the arrangement of the first body with respect to the second body; and
    sending the control signals to an external device.

13. The method of claim 12, further comprising:
    displaying a virtual control based on the arrangement of the first and second bodies; and
    reconfiguring the virtual control in response to a change in the arrangement of the first and second bodies.

14. The method of claim 12, further comprising selecting a signaling protocol based on the arrangement of the first and second bodies.

15. The method of claim 14, wherein selecting the signaling protocol further comprises selecting a different signaling protocol in response to a change in the arrangement of the first and second bodies.

16. The method of claim 12, wherein the first user input device comprises a first touch panel and the second user input device comprises a second touch panel, the method further comprising configuring the second touch panel as a continuation of the first touch panel in response to the first and second bodies being arranged in a first configuration.

17. The method of claim 12, wherein sending the control signals comprises:
sending first control signals suitable for controlling a first external device in response to the first and second bodies being arranged in a first configuration; and
sending second control signals suitable for controlling a second external device, different than the first external device, in response to the first and second bodies being arranged in a second configuration.

18. A program product comprising a non-transitory computer readable storage medium that stores code executable by a processor to perform:
determining an arrangement of an input device;
mapping the determined arrangement to an input profile;
receiving user input from the input device;
generating control signals from the received input according to the input profile, wherein generating control signals comprises generating input commands specific to the determined arrangement and
sending the control signals to an external device.

19. The program product of claim 18, further comprising code to perform:
displaying a virtual control on the input device based on the arrangement of the input device; and
reconfiguring the virtual control on the input device in response to a change in the arrangement of the input device.

20. The program product of claim 19, further comprising code to perform:
selecting a signaling protocol based on the arrangement of the input device; and
sending the control signals to an external device using the selected signaling protocol.

* * * * *